United States Patent
McGeorge, Jr.

(10) Patent No.: US 6,951,012 B2
(45) Date of Patent: Sep. 27, 2005

(54) API TO INCREASE DEBUG LOG PERFORMANCE

(75) Inventor: Vernon E. McGeorge, Jr., San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 549 days.

(21) Appl. No.: 09/968,552

(22) Filed: Oct. 2, 2001

(65) Prior Publication Data
US 2003/0066052 A1 Apr. 3, 2003

(51) Int. Cl.$^7$ .................................. G06F 9/44
(52) U.S. Cl. ................ 717/124; 719/313; 719/328
(58) Field of Search .............. 717/124; 719/313–315, 719/328; 709/224, 225; 714/38

(56) References Cited

U.S. PATENT DOCUMENTS

| | | | | |
|---|---|---|---|---|
| 5,533,192 A | | 7/1996 | Hawley et al. ........ 395/183.04 |
| 5,612,898 A | * | 3/1997 | Huckins ................. 709/224 |
| 5,784,552 A | * | 7/1998 | Bishop et al. ............. 714/38 |
| 5,815,653 A | * | 9/1998 | You et al. ................. 714/38 |
| 5,901,315 A | * | 5/1999 | Edwards et al. .......... 717/124 |
| 6,202,174 B1 | | 3/2001 | Lee et al. ................ 714/38 |
| 6,470,388 B1 | * | 10/2002 | Niemi et al. ............ 709/224 |

OTHER PUBLICATIONS

Venkatesan et al. "Testing and debugging distributed programs using global predicates" 1995 IEEE, pp. 163–177.*
Hutchings et al. "Designing and debugging custom computing applications" 2000 IEEE, pp. 20–28.*

* cited by examiner

*Primary Examiner*—St. John Courtenay, III
*Assistant Examiner*—Van Nguyen

(57) ABSTRACT

A method for increasing debug log performance uses pre-logging subroutines, i.e., helper methods, to pass multiple elements of a string message as separate parameters. The helper methods typically determine whether a debug logging system is enabled at a specific logging level before allocating memory or CPU resources for string concatenation. If the debug logging system is disabled, the method returns to the client program without allocating resources to concatenate and log the message, thus significantly increasing debug log performance.

19 Claims, 3 Drawing Sheets

API TO INCREASE DEBUG LOG PERFORMANCE

CROSS-REFERENCE TO RELATED APPLICATIONS

This patent application is related to U.S. patent application, Ser. No. 09/968,553, entitled "API to Enforce Internationalization," and filed on the same day herewith.

TECHNICAL FIELD

The technical field relates to computer software systems, and, in particular, to application programming interfaces that increase debug log performance.

BACKGROUND

All computer software programs need to be debugged and tested to ensure that they properly perform the tasks they are designed to perform. The act of identifying cause of known problems (referred to as bugs) and fixing these problems in a program is called "debugging" the program.

One way to debug a computer program is to insert output statement at various points in the program. The output of these statements may be directed to a debug log, where multiple elements, i.e., parameters, of a message are complied together. These output statements may be implemented as simpler print or write statements, as defined in the programming language. More typically, these output statements are implemented as calls to logging methods, giving a programmer the capability of turning debug messages on or off, altering the messages, or directing the messages to a log file.

In its simplest form, a debug message is a text string presented to a user on a screen display device or written to a file storage device. In reality, a debug message is only useful if it displays the values of interesting parameters from the program. To display these values, the program typically evaluates the parameters using CPU resources to convert these values to displayable strings. These strings are combined with other strings supplied by the user into a single string to be displayed or logged. This string concatenation process consumes additional CPU and memory resources. One of the most important causes of resource consumption is the dynamic allocation of memory to contain concatenated strings.

In a typical implementation of a debug log, even before a decision to log a message is made, all resources required to evaluate parameters and concatenate results into a displayable string have been expended. While this expense may be minor compared to actually logging the message, in a well instrumented system with thousands of debug log messages, the high volume of these messages (even if not logged) can have a significantly adverse impact on performance or the program.

String concatenation is an expensive operation in any programming language, but is particularly expensive in Java language because Java language creates a new immutable string object for each concatenation and discards the prior object at each step. This process involves expensive object creation as well as extensive fragmentation, which adversely impacts garbage collection. Garbage collection is the process of finding and recovering dynamically allocated memory and returning this memory to the pool of available memory that can be allocated as needed in the future.

Various efforts have been made to selectively enable debug logging to isolate problems, while at the same time, disabling the majority of debug logging to increase performance. One solution is to use conditional compilation to disable debug logging in production code. Conditional compilation uses compiler directives to cause certain code to be included or excluded during a compilation process. However, this solution may make the debug logging only available to the developer, and inaccessible to on-line or off-line support personnel. In addition, conditional compilation is not available in all computer languages (e.g. Java language).

Another solution is commenting out the debug logging prior to release. Commenting out means manually editing the code to convert debug logging code to comments. However, this solution is tedious and difficult to do without the risk of causing other defects associated with improper editing. In addition, if the commenting out is performed later in the development cycle, more risk is incurred; but if performed earlier, less benefit is received.

Yet another solution is removing and/or simplifying some logging to reduce the performance impact. However, the logging removed may be just the logging required to isolate a problem.

Still another solution is tolerating poor performance. However, lackluster performance may be tolerable, but is never desirable. Additionally, the impact is not only on the program containing the debug logging, but also on all programs that contend for resources on the system.

SUMMARY

A method for increasing debug log performance includes receiving a message, which includes parameters, from a client program and allocating resources to evaluate the parameters into multiple strings. The method further includes calling a pre-logging subroutine, i.e., helper method, that passes each string of the message as a separate parameter to a debug logging system, and determines whether the debug logging system is enabled at a specific logging level. If the debug logging system is disabled, the method includes returning to the client program without allocating additional resources to concatenate and log the message.

The helper methods provide an enhancement to the debug logging system that may defer as much of the processing of a debug log statement as possible until after the decision to log or not log the message can be made. Because the helper methods determine whether a debug logging system is enabled at a specific logging level before allocating memory or CPU resources for string concatenation, the method may significantly increase debug log performance.

DESCRIPTION OF THE DRAWINGS

The preferred embodiments of a method for increasing debug log performance will be described in detail with reference to the following figures, in which like numerals refer to like elements, and wherein.

DETAILED DESCRIPTION

A method for increasing debug log performance uses pre-logging subroutines, i.e., helper methods, to pass multiple elements of a string message as separate parameters. The helper methods typically determine whether a debug logging system is enabled at a specific logging level before allocating memory or CPU resources for string concatenation, thus significantly increasing debug log performance.

In a typical software application, logging may be performed at a variety of different logging levels. One end of the spectrum is filled with low volume, high priority messages that must be logged. At the other end are thousands of high volume, low priority debug messages. To reduce the flood of the debug log messages, the user typically sets a limit based on the log level of the message. This limit typically excludes the high volume messages. A programmer, i.e., developer, typically has the ability to "turn up" or re-enable debug log messages for portions of program that he or she is interested in debugging.

Figure 1:
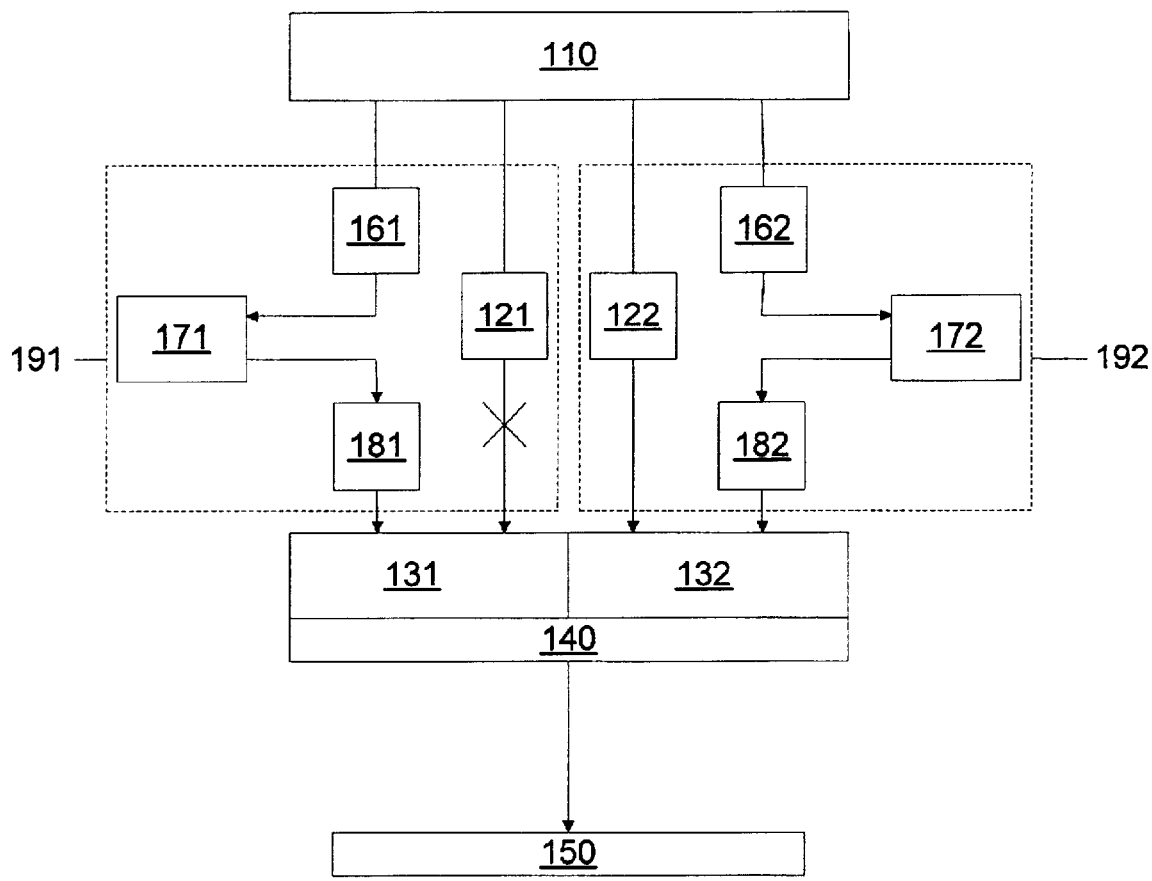
FIG. 1 illustrates an exemplary logging system application programming interface (API)

FIG. 1 illustrates a logging system API that includes a client program 110, a raw logging interface 140, and a log 150. Messages 191, 192 from the client program 110 may be divided into two distinct types: 1) operational logging—low volume, high priority messages 191 that must be logged during normal operation in a localized manner; and 2) debug logging—high volume, low priority messages 192 that may be logged only as requested by a developer. The raw logging interface 140 that writes a message 191, 192 to the log 150 at a specific logging level may not be implemented as a public interface and may not be accessible by users working on the client program 110. The public interface that is exposed to the users may be defined as a set of helper methods, such as helper methods 131 for operational logging and helper methods 132 for debug logging.

The interface 131 for operational logging typically processes operational log messages 191 intended for helping the users to operate the client program 110, such as warning information concerning a potential problem or an error indicating the failure of a certain function. The interface 132 for debug logging typically processes debug log messages 192 to be used by the developers to isolate defects in the client program 110. The logging of the debug log messages 192 typically consumes more time and memory resources. Both interfaces 131, 132, may be used by the developer, who decides which interface to use depending on the intent of the message, 191, 192. The only significant difference between the interfaces 131, 132, is the logging level.

Method signatures of the helper methods 132 for the debug log messages 192 typically accept both a localized message 182 and a string message 122, which is a text string to be presented to the user or to be logged. A method signature is a formal definition of calls to a method (or subroutine) that includes the name of the method and the number and types of parameters that may be passed to the method. In modern (and particularly object oriented) computer languages, the method signature is used to select which version of a method will be called when multiple versions (i.e., methods with the same method name but different parameters) of a method exist.

As noted above, besides high volume localized messages 182, the helper methods 132 for debug logging typically accept string messages 122 that are parsed into multiple parameters, i.e., strings. An exemplary call statement to log a debug string message 122 is shown below. The call statement contains three string concatenation operations that may be performed prior to calling a debug helper method 132.

log_.debug ("At $x=$"+$x$+"$y =$"+$y$);

The following statement passes each element of the string message 122 to the debug logging system as a separate parameter.

log_.debug ("At $x=$", $x$, "$y=$", $y$);

The helper methods 132 may be defined for any number of parameters up to an arbitrary limit, which may be extended as needed by defining additional helper methods 132.

To ensure minimum resource utilization, the helper method 132 for debug logging may first determine whether the debug logging system is disabled at a specific logging level before allocating resources for string concatenation. The helper method 132 may return immediately if logging is not enabled at the logging level. Accordingly, the separate strings are concatenated into a single message 192 only if debug logging actually occurs. By deferring string concatenation until after this logging decision is made, the method saves memory and CPU resources, and increases debug log performance.

Heavily instrumented code may contain hundreds or even thousands of debug statements, many of which may be executed repetitively in tight loops. Since the method for increasing debug log performance may yield performance many times faster than other debug logging methods, the performance of heavily instrumented code may be greatly influenced by the efficiency of the logging API. The method may also reduce the impact of debug logging on garbage collection. By only allocating space to concatenate the strings actually needed, there is no need to recover the resources for the hundreds of log messages that are not logged.

Because string concatenation is particularly expensive in Java language, the use of the helper methods 132 has a big impact on Java language applications. However, the method for increasing debug log performance may be equally applied to any other programming language.

Figure 2:
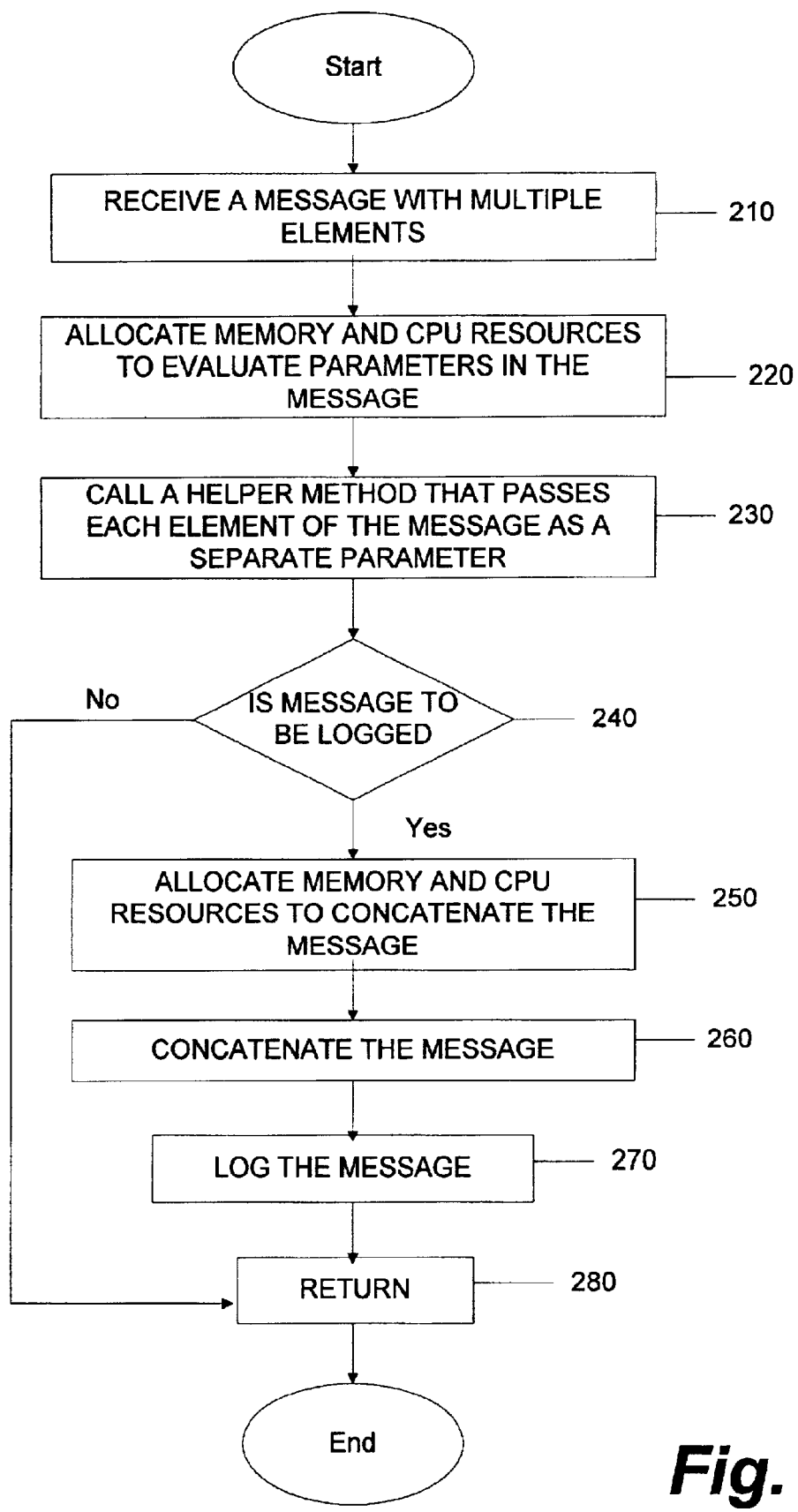
FIG. 2 is a flow chart illustrating an exemplary method for increasing debug log performance.

FIG. 2 is a flow chart illustrating an exemplary method for increasing debug log performance. After receiving a debug log message 192 with multiple parameters, step 210, the client program 110 first allocates memory and CPU resources to evaluate parameters into multiple strings, step 220. Next, the client program 110 typically calls the helper methods 132 for debug logging, step 230. The helper methods 132 may pass each string of the message 192 as a separate parameter to the raw logging interface 140. Then, if the debug logging system is enabled, and the message 192 is to be logged, step 240, the client program 110 may allocate additionally memory and CPU resources to concatenate and log the message 192, step 250. Next, after the messaged is concatenated and logged, steps 260 and 270, respectively, the process returns to the client program 110, step 280. However, if the debug logging system is disabled, or the message 192 is not to be logged, the process returns directly to step 280 without allocating additional resources to concatenate and log the message 192, thus saving memory and CPU resources, and improving debug log performance.

Figure 3:
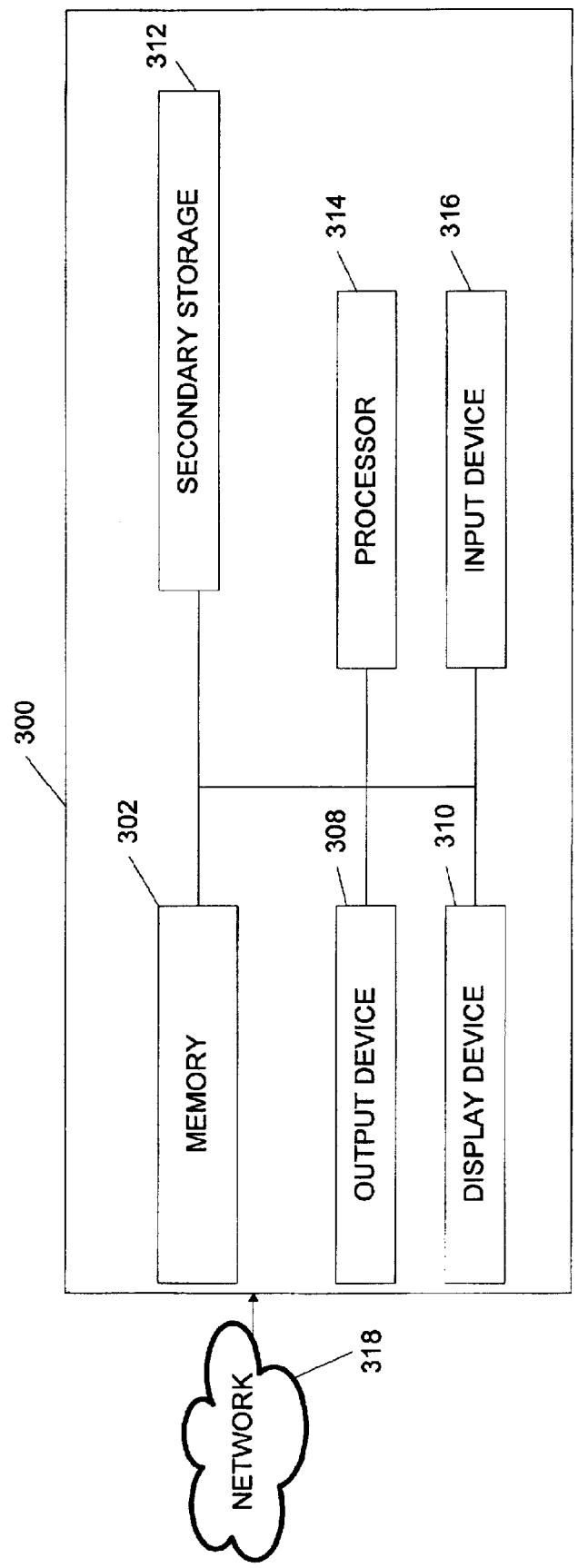
FIG. 3 illustrates exemplary hardware components of a computer that may be used in connection with the exemplary method for increasing debug log performance of FIG. 2.

FIG. 3 illustrates exemplary hardware components of a computer 300 that may be used in connection with the exemplary method for increasing debug log performance. The computer 300 includes a connection with a network 318 such as the Internet or other type of computer or telephone networks. The computer 300 typically includes a memory 302, a secondary storage device 312, a processor 314, an input device 316, a display device 310, and an output device 308.

The memory 302 may include random access memory (RAM) or similar types of memory. The secondary storage device 312 may include a hard disk drive, floppy disk drive, CD-ROM drive, or other types of non-volatile data storage, and may correspond with various databases or other resources. The processor 314 may execute information stored in the memory 302, the secondary storage 312, or received from the Internet or other network 318. The input device 316 may include any device for entering data into the computer 300, such as a keyboard, keypad, cursor-control device, touch-screen (possibly with a stylus), or microphone. The display device 310 may include any type of device for presenting visual image, such as, for example, a computer monitor, flat-screen display, or display panel. The output device 308 may include any type of device for presenting data in hard copy format, such as a printer, and other types of output devices including speakers or any device for providing data in audio form. The computer 300 can possibly include multiple input devices, output devices, and display devices.

Although the computer 300 is depicted with various components, one skilled in the art will appreciate that the computer 300 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 300 to perform a particular method.

While the method and apparatus for increasing debug log performance have been described in connection with an exemplary embodiment, those skilled in the art will understand that many modifications in light of these teachings are possible, and this application is intended to cover any variations thereof.

What is claimed is:

1. A computer-implemented method for increasing debug log performance, comprising:
   receiving a message from a client program, wherein the message includes parameters;
   allocating resources to parse the parameters into multiple strings;
   calling a pre-logging subroutine, wherein the pre-logging subroutine passes each string of the message as a separate parameter to a debug logging system through a raw logging interface, and determines whether the debug logging system is enabled at a specific logging level wherein the raw logging interface cannot be implemented as a public interface and cannot be accessible by users working on the client program;
   concatenating the multiple strings into a single message only if the debug logging system is enabled; and
   if the debug logging system is disabled, returning to the client program without allocating additional resources to concatenate the multiple strings and log the message.

2. The computer-implemented method of claim 1, wherein if the debug logging system is enabled, further comprising allocating additional resources to concatenate the message.

3. The computer-implemented method of claim 1, further comprising logging the message.

4. The computer-implemented method of claim 1, wherein the calling step includes calling a helper method for debug logging.

5. The computer-implemented method of claim 1, wherein the calling step includes calling a helper method that processes debug log messages.

6. The computer-implemented method of claim 1, wherein the calling step includes passing string messages to the debug logging system.

7. The computer-implemented method of claim 1, wherein the calling step includes calling the pre-logging subroutine only if requested by a developer of the client program.

8. A logging system application programming interface (API) executing on a computer system, comprising:
   one or more pre-logging subroutines, wherein parameters within a message are parsed into multiple strings, and wherein the one or more pre-logging subroutines pass each string of the message as a separate parameter to a debug logging system, and
   a raw logging interface that writes the message to a log wherein the raw logging interface cannot be implemented a public-interface and cannot be accessible by users working on the client program,
   wherein the one or more pre-logging subroutines determine whether the debug logging system is enabled at a specific logging level before allocating resources to concatenate and log the messages;
   wherein the multiple strings are concatenated into a single message only it the debug logging system is enabled; and
   if the debug logging system is disabled, returning to the client program without allocating additional resources to concatenate the multiple strings and log the message.

9. The logging system API of claim 8, wherein if the debug logging system is enabled, the resources are allocated to concatenate and log the message.

10. The logging system API of claim 8, wherein the one or more pre-logging subroutines are helper methods for debug logging.

11. The logging system API of claim 8, wherein the one or more pre-logging subroutines process debug log messages.

12. The logging system API of claim 8, wherein the message is a string message.

13. A tangible computer readable medium providing instructions for increasing debug log performance, the instructions comprising:
   receiving a message from a client program, wherein the message includes parameters;
   allocating resources to parse the parameters into multiple strings;
   calling a pre-logging subroutine, wherein the pre-logging subroutine passes each string of the message as a separate parameter to a debug logging system through a raw logging interface, and determines whether the debug logging system is enabled at a specific logging level, wherein the raw logging interface cannot be implemented as a public interface and cannot be accessible by users working on the client program;
   concatenating the multiple strings into a single message only if the debug logging system is enabled; and if the debug logging system is disabled, returning to the client program without allocating additional resources to concatenate the multiple strings and log the message.

14. A The tangible computer readable medium of claim 13, wherein if the debug logging system is enabled, further comprising instructions for allocating additional resources to concatenate the message.

15. The tangible computer readable medium of claim 13, further comprising instructions for logging the message.

16. The tangible computer readable medium of claim 13, wherein the instructions for calling include instructions for calling a helper method for debug logging.

17. The tangible computer readable medium of claim 13, wherein the instructions for calling include instructions for calling a helper method that processes debug log message.

18. The tangible computer readable medium of claim 13, wherein the instructions for calling include instructions for passing string messages to the debug logging system.

19. The tangible computer readable medium of claim 13, wherein the instructions for calling include instructions for calling the pre-logging subroutine only if requested by a developer of the debug logging system.

* * * * *